United States Patent Office 3,639,449
Patented Feb. 1, 1972

3,639,449
PROCESS FOR MANUFACTURE OF ESTERS OF CARBOXYLIC ACIDS
Taiseki Kunugi, Tokyo, Japan, assignor to Mitsui Petrochemical Industries, Ltd., and Taiseki Kunugi, both of Tokyo, Japan, fractional part interest to each
No Drawing. Filed Mar. 14, 1968, Ser. No. 712,925
Claims priority, application Japan, Mar. 18, 1967, 42/16,718; Mar. 27, 1967, 42/18,626
Int. Cl. C07c 69/54, 69/80
U.S. Cl. 260—475 N                        15 Claims

ABSTRACT OF THE DISCLOSURE

A new process for the manufacture of esters of carboxylic acid to commercial and technical advantage by catalytically reacting a wide range of alcohols, their mixtures, or mixtures consisting of these alcohols or their mixtures and aldehydes in the copresence of molecular oxygen in the presence of a catalyst selected from the group consisting of metals of Group 8 of the periodic table having an atomic number from 44 to 78, oxides of these metals, pretreated products of these metals and pretreated products of these metal oxides, with the proviso that when alcohols alone are reacted with molecular oxygen, at least one primary alcohol should be present in said alcohols.

---

This invention relates to a process for the manufacture of esters of carboxylic acid to commercial advantage by catalytically reacting a wide range of alcohols, their mixtures, or mixtures consisting of these alcohols or their mixtures and aldehydes in the copresence of molecular oxygen. More particularly, it relates to a process for the manufacture of esters of carboxylic acid which comprises reacting a member selected from the group consisting of at least one alcohol and a mixture of at least one alcohol and at least one aldehyde, with molecular oxygen in the presence of a catalyst selected from the group consisting of metals of Group 8 of the periodic table having an atomic number from 44 to 78, oxides of these metals, pretreated products of these metals and pretreated products of these metal oxides, with the proviso that when alcohols alone are reacted with molecular oxygen, at least one primary alcohol should be present in said alcohols.

As a method of preparing esters of carboxylic acid, especially relatively simple esters, unique is the Tishchenko reaction in which aluminum alcoholate is used as a catalyst. This is, for instance, a method of producing ethyl acetate by a liquid-phase disproportionation reaction of acetaldehyde as shown in the following formula:

$$2CH_3CHO \rightarrow CH_3COOC_2H_5 \qquad (1)$$

This method has defects such as the trouble of using chlorine and zinc oxide as auxiliary catalysts besides a main catalyst and the formation of by-products such as aldol, crotonaldehyde, ethanol, acetal, paraldehyde and crotonic acid. The method also undergoes unstability in operation.

There is also a liquid-phase method similar to the Wacker process (French Pat. 1,372,946) by which part of the above aldehyde is replaced by an alcohol, and an ester is prepared by the condensation-oxidative dehydrogenation reaction between the aldehyde and the alcohol as shown in the following formula:

(2) $$CH_3CHO + C_2H_5OH \xrightarrow{PdCl_2} CH_3COOC_2H_5 + H_2$$

Actually, the palladium chloride catalyst generates hydrogen chloride after the end of the above reaction, and reduced palladium is deposited out of the system. Hence, it is necessary to regenerate the catalyst. In this method, copper chloride or copper acetate is added for the oxidation of the catalyst, and the reduced palladium is oxidized to palladium chloride with oxygen in the following manner.

(3) $$Pd + 2HCl + \tfrac{1}{2}O_2 \xrightarrow{catalyst} PdCl_2 + H_2O$$

With a view to avoiding such complicated two-stage process, a proposal has been made to carry out the process in one step (Formula 4).

(4) $$CH_3CHO + C_2H_5OH + \tfrac{1}{2}O_2 \rightarrow CH_3COOC_2H_5 + H_2O$$

$$CH_3CHO + C_2H_5OH + \tfrac{1}{2}O_2 \rightarrow CH_3COOC_2H_5 + H_2O \qquad (4)$$

According to this method, however, a large quantity, that is, a stoichiometrical amount, of such a compound as lithium salt must be added as an acceptor of water in order to promote the reaction. Because of the presence of a large quantity of such reaction promotor, the reaction system becomes very much complicated. In addition, the reaction is very slow, and for instance, a period of as long as 13 hours is necessary for obtaining 75% conversion of acetaldehyde in methanol and 67% selectivity of the ester.

There is another method, in which an alcohol alone is used as a starting material, and oxidized with air with the use as catalyst of bromine-nitric acid or hydrogen bromide-nitrous acid, thereby forming an ester by oxidative dehydrogenation. (E. F. Lutz, International Oxidation Symposium, II–569 (1967), arranged by Standford Research Institute)

$$2R \cdot CH_2OH + O_2 \rightarrow R \cdot COOCH_2R + 2H_2O \qquad (5)$$

(R is hydrogen, hydrocarbon radical, etc.)

This reaction is carried out at 40 to 100 atmospheric pressures, and necessitates solvent. Furthermore, although the reaction is effective for higher primary aliphatic alcohols, it gives rise to low yields of final esters and great quantities of by-products when applied to lower alcohols.

Accordingly, an object of this invention is to provide a new process for the manufacture of esters of carboxylic acid at high yields in a simple reaction system while removing the above-mentioned defects and inhibiting the side-reactions.

During the course of study of a catalyst for the preparation of esters of carboxylic acid by condensation-oxidative dehydrogenation of alcohols according to Formula 5 above, I found to my surprise that 16% of ethyl alcohol was reacted and ethyl acetate was obtained at a selectivity of 88% when a mixture of ethyl alcohol and oxygen was passed at normal atmospheric pressure at 108° C. through a catalyst of metallic palladium on active carbon packed in a reaction tube. Furthermore I passed a mixture of acetaldehyde, methanol and oxygen through the same catalyst at normal atmospheric pressure at 120° C. 77% of acetaldehyde was reacted, and I obtained methyl acetate at a selectivity of 86%.

Based on this fact, I conducted a number of experiments on the condensation-oxidative dehydrogenation reaction of various saturated and unsaturated aliphatic and aromatic alcohols, mixtures of these, mixtures of various saturated and unsaturated aliphatic and aromatic aldehydes with the alcohols, and catalyst metals, etc., and finally found the following new facts.

(1) The present process is applicable to saturated and unsaturated aliphatic and aromatic alcohols and mixture of these.

(2) An ester can be prepared from a combination of two alcohols. For instance, isopropyl acetate can be easily prepared according to the present process from ethanol and isopropanol.

(3) Different main products can be obtained, depending on the type of alcohol and reaction conditions, from a combination of two alcohols. For instance, from a combination of methanol and ethanol, methyl formate, ethyl formate, methyl acetate and ethyl acetate are formed, but one or two of them can be formed as main products by the choice of the reaction conditions.

(4) A primary alcohol must be used as a starting alcohol corresponding to the acid in a final ester, but any of primary, secondary or tertiary alcohols can be used as a starting alcohol corresponding to the alcohol in the ester.

(5) The present reaction is applicable to mixtures of saturated and unsaturated aliphatic and aromatic aldehydes and alcohols.

(6) Acrylic acid ester and methacrylic acid ester, which seems to be comparatively difficult to produce at present, can be easily prepared by the present process from acrolein and methacrolein respectively.

(7) As a catalyst, metals of Group 8 of the Periodic Table having an atomic number of 44 to 78, that is, Ru, Rh, Pd, Os, Ir, and Pt are effective, and Ru, Rh, Pd, Ir and Pt being preferable. Particularly preferable among them are Pd, Rh and Ir.

(8) Mixtures of two or more of these metals are also effective as catalyst.

(9) These metals, oxides of these metals, hydroxides of these metals (inclusive of hydrated oxides of these metals), pretreated products of these metals, pretreated products of these metal oxides, pretreated products of these metal hydroxides, and mixtures of two or more of these are effective as catalysts. It should be noted in this connection that the term "metal oxide" used in the specification and claims includes hydroxides and hydrated oxides of metals besides oxides of metals. Catalysts prepared by supporting the above-mentioned catalyst components on such a carrier as alumina, silica, active carbon and diatomaceous earth are also effective. It should therefore be noted that the term "catalyst" used in the specification and claims includes catalysts supported on carriers.

(10) As the molecular oxygen, air, a mixture of oxygen and nitrogen or a mixture consisting predominantly of these can be used besides oxygen. It should be noted therefore that the term "molecular oxygen" used in the specification and claims includes gases containing molecular oxygen.

From the discovery of these facts, I have arrived at the present invention which relates to a process for the manufacture of esters of carboxylic acid by contacting a member selected from the group consisting of at least one alcohol and a mixture of at least one alcohol and at least one aldehyde, such as an alcohol, mixtures of alcohols, materials consisting mainly of the alcohol, mixtures of aldehydes and alcohols, and mixtures consisting mainly of these, together with molecular oxygen such as oxygen, air, a mixture of oxygen and nitrogen and a mixture consisting mainly of these, with a catalyst selected from the group consisting of metals of Group 8 of the Periodic Table having an atomic number of 44 to 78, oxides of these metals, pretreated products of these metals and pretreated products of these metal oxides, such as at least one of the metals of Group 8 of the Periodic Table having an atomic number of 44 to 78, oxides of said metals, pretreated products of said metals, pretreated products of said metal oxides, mixtures of these, and these components supported on a carrier, to thereby form esters of corresponding carboxylic acid; and also to catalysts for the preparation of esters of carboxylic acid by subjecting a member selected from the group consisting of at least one alcohol and a mixture of at least one alcohol and at least one aldehyde and molecular oxygen to oxidative dehydrogenation reaction.

The advantages of the present invention, which have partly been given above, are summarized as follows:

(1) A complicated reaction operation and the use of various auxiliary reagents can be omitted since esters of carboxylic acid can be prepared by oxidative dehydrogenation reaction with the use of a simple system comprising alcohol, oxygen and a catalyst or a system comprising aldehyde, alcohol, oxygen and a catalyst.

(2) The process is very economical since esters of carboxylic acid can be prepared at high conversions and yields by the condensation-oxidative dehydrogenation of an alcohol, mixtures of alcohols, or mixtures of aldehydes and alcohols.

(3) Even when two or more esters are formed from a combination of two or more alcohols, one or two of the products can be recovered as main products by selecting the reaction conditions.

(4) There are less side-reactions such as combustion reaction, and products are relatively simple. Hence, the separation and purification after reaction can be easily effected.

(5) As the reaction rate is high, it is possible to increase an amount of raw materials to be treated per unit volume of reaction vessel.

(6) The preparation and handling of catalysts is easy, and they can be handled in the form of metal elements or metal oxides in charging them into a reaction vessel. Even in case of necessity of regeneration, they can be regenerated with great simplicity.

(7) The lives of the catalysts are long, and the troublesome regeneration of the catalysts is not necessary.

The present invention can be applied to any alcohol and aldehyde. Examples of the alcohol are saturated aliphatic primary, secondary and tertiary alcohols having straight or side chains such as methanol, ethanol, propanol, butanol, pentanol, hexanol, heptanol, octanol, dodecanol, tetradecanol, hexadecanol and octadecanol; unsaturated aliphatic primary, secondary and teritary alcohols having straight or side chains such as allyl alcohol, crotyl alcohol, β-methallyl alcohol, octenol and dodecenol; alicyclic alcohols such as cyclohexanol; aromatic alcohols such as phenol, cresol and benzyl alcohol; and aliphatic and aromatic polyhydric alcohols such as ethylene glycol, propylene glycol, glycerine, hydroquinone and p-hydroxybenzyl alcohol.

As the aldehyde, the following can be mentioned: saturated aliphatic aldehydes having straight or side chains such as formaldehyde, acetaldehyde, propionaldehyde, butyraldehyde, glyoxal and ethylene dialdehyde; unsaturated aliphatic aldehydes having straight or side chains such as acrolein, methacrolein, crotonaldehyde and acetylene dialdehyde; aromatic aldehydes such as benzaldehyde, tolualdehyde, benzylaldehyde and phthaldialdehyde; and their derivatives.

These alcohols and aldehydes may be used alone or in combination. Substances composed mainly of said alcohol or aldehyde can also be used as the starting materials of the present invention.

When one alcohol is used as a starting material in preparing an ester in a system comprising an alcohol, oxygen and a catalyst, the alcohol ought to be a primary alcohol. When an alcohol other than primary alcohol is used, it is absolutely necessary that a primary alcohol corresponding to the acid in the final ester be used conjointly.

If polyhydric alcohols and polyvalent aldehydes are used, it is possible to form polymeric esters. Glycols and dialdehydes give linear polyesters, and three or more polyhydric alcohols and polyvalent aldehydes given rise to three dimensional or basket-like polyesters.

When an alcohol or alcohols alone are reacted with molecular oxygen to form esters of carboxylic acid, saturated aliphatic primary alcohols having 1 to 12 carbon atoms are preferable, especially preferred being methanol, ethanol, n-propanol and n-butanol. When an aldehyde an alcohol are reacted with each other in the presence of molecular oxygen to form a ester of carboxylic acid, it is preferable to use a saturated aliphatic aldehyde having 1 to 4 carbon atoms such as formaldehyde, acetaldehyde, propionaldehyde and butyraldehyde and a saturated aliphatic alcohol having 1 to 20 carbon atoms. If an unsaturated aldehyde such as acrolein and methacrolein is reacted with methanol, an methyl ester of unsaturated carboxylic acid can be prepared at a high yield, and this process is commercially excellent. Furthermore, this process is preferable when an aldehyde such as acetaldehyde and phthaladehyde and allyl alcohol are reacted with each other to form an ester corresponding carboxylic acid.

The ratio of the alcohol to oxygen and the ratio of the aldehyde to alcohol to oxygen are determined depending not only on the reaction conditions such as the concentration of oxygen, pressure, temperature and contact time, but the type of the catalysts, combinations of the metals, state of the metal at the time of charging into the reaction vessel, that is, whether it is in the form of reduced metal or oxide or pretreated product, and presence or absence of a carrier. From these various conditions, it is possible to determine the optimum conditions suitable for the starting materials and resulting esters of carboxylic acid. Although I cannot set a definite limitation on the range of such conditions, it is necessary to employ such conditions as will minimize the occurrence of side-reactions such as combustion reaction. The side-reaction mentioned above mean reactions which lead to the formation of $CO$, $CO_2$, $CH_4$, olefins, acids, aldehydes lower than the starting aldehydes.

If, for instance, at least one alcohol having 1 to 4 carbon atoms and molecular oxygen are reacted by passing them over a metallic palladium catalyst on active carbon (0.5% by weight of metallic palladium) at 80 to 150° C. and 1 to 8 atmospheres, it is preferable to maintain a mole ratio of the alcohol to oxygen at 10:3–0.6. On the other hand, when an aldehyde having 1 to 4 carbon atoms and an alcohol having 1 to 4 carbon atoms are reacted with molecular oxygen under the same reaction conditions on a catalyst composed of metallic palladium on active carbon (0.5% by weight of metallic palladium), it is preferable that a mole ratio of the aldehyde to alcohol to oxygen should be 1:1–2:0.4–0.6.

The above-mentioned metals and metal compounds used as catalysts in the present invention are common in that they induce an ester formation reaction with the above-mentioned reaction mixtures. In view of the catalytic activity, however, catalysts selected from the group consisting of metals of Group 8 of the periodic table having an atomic number of 44 to 78, pretreated products of said metals and pretreated products of oxides of said metals are especially excellent and recommended. The term "catalyst" used in the specification and claims includes a plurality of said metals. In the course of preparation of the catalysts of the present invention, these metals may be present as salts, but when used to form the esters according to the process of the present invention, they should consist mainly of metal elements, oxides of said metals and/or pretreated products of these metals.

The activity of metals of Group 8 of the periodic table having an atomic number of 44 to 78 (usually used in the form of reduced metals prepared by reducing metal compounds) is the highest, and the activity of oxides and hydroxides of these metals is relatively low. The activity of the pretreated products of these comes in between.

As such pretreated products, we can mention treated products of metals of Group 8 of the periodic table having an atomic number of 44 to 78 obtained by reducing the compounds of these metals such as nitrates, chlorides and organic acid salts, and contacting the reduced metals with a system which contains at least one of oxygen-containing compounds as starting material, oxygen-containing compounds as reaction product and oxygen-containing compounds such as ketones and organic acids, and treated products of metals of Group 8 of the periodic table having an atomic number of 44 to 78 obtained by contacting the metals with a mixture consisting of at least one of the above-mentioned oxygen-containing compound and molecular oxygen. Such pretreated products also include treated products of oxides of the metals of Group 8 of the periodic table having an atomic number of 44 to 78 obtained by contacting the oxides of these metals with a system containing at least one of the said oxygen-containing compounds, and treated products of oxides of such metals obtained by contacting them with a mixture of at least one of the said oxygen-containing compound and a reducing gas such as hydrogen and carbon monoxide.

Thus, it is possible to form pre-treated products which come between reduced metals and metal oxides. That the system of the starting raw materials and the system of the reaction products of the present invention serve for this pre-treatment means that the catalyst life is remarkably long in the present invention. This is commercially very advantageous.

The composition of the pretreated product as catalyst is not clearly known, but it is presumed that the surface of catalyst metal is coupled with at least one of said oxygen-containing compound and/or molecular oxygen to form catalytically active surface. It is expected that during the reaction for preparing esters, such combined substance on the surface of pretreated products will be somewhat modified by starting raw materials and substances derived from them, and such coupled substance are present together with the matrix metal or at least one of its oxides.

As the carrier for the catalyst of the present invention, silica, alumina, diatomaceous earth and active carbon are effective either alone or in combination.

An amount of the catalyst to be supported on the carrier is ordinarily less than 20% by weight, and in view of activity and economy, an amount less than 5% by weight is sufficient. The use of it in an amount more than 20% by weight, however, is not at all detrimental to the carrying out of the present invention. Furthermore, the present invention can do without a catalyst support.

The reaction temperature in the present invention is 0 to 300° C., preferably room temperature to 200° C. If the temperature is above 300° C., side-reactions arising from the oxidation become active and give rise to a remarkable decrease in the yield of esters. If, on the other hand, the temperature comes down to below 0° C., there is a marked decrease in the rate of reaction even if such a highly reactive substance as methanol is used, and esters can be obtained only at tiny yields.

The catalytic reaction of the present invention can be carried out either in gas-phase, liquid-phase or gas-liquid mixed phase. In the gas-phase reaction, operation can be performed either in a fixed bed, moving bed or fluidized bed. When the reaction is to be carried out in liquid phase, a reaction vessel such as bubble reactor is of much effect.

The reaction pressure to be employed in the present invention is normal atmospheric pressure to 300 atmospheres, preferably normal atmospheric pressure to 30 atmosphres. If the present process is carried out in liquid phase, the activity of the catalyst is very high even at low temperatures, and the oxygen absorption often gets the reaction rate under control. Hence, it is very effective to increase the solubility of oxygen by pressure because the space time yield can be increased.

The present invention will now be illustrated by examples. The invention however is not limited to these examples, and various modifications can be made within the spirit and scope of the invention.

EXAMPLE 1

Palladium chloride ($PdCl_2$) (0.82 g.) was dissolved into aqueous solution of hydrochloric acid while heating, and the solution was diluted. The diluted solution was well mixed in an evaporating dish with 92 g. of granular active carbon purified with nitric acid. The mixture was evaporated to dryness over a water bath, and further dried in an air bath at 100° C. while well stirring. The resulting palladium chloride on active carbon was charged into a reducing apparatus of the fixed bed circulation type, and reduced by introduction of hydrogen for 7 hours at 300° C. An active carbon catalyst supporting 0.5% of metallic palladium resulted.

The hydrogen gas from the reaction vessel was passed through 0.1 N NaOH, and the amount of HCl generated during the reduction was calculated from the amount of the consumed NaOH. It was found that almost all of the palladium chloride had been reduced.

EXAMPLE 2

Hexachloroplatinic acid ($H_2PtCl_6 \cdot 6H_2O$) was dissolved into water, and was melted at 500° C. together with sodium nitrate in a pyrex beaker. After cooling, the reaction mixture was solidified, and water was added to it. The resulting brown precipitate was subjected once or twice to decantation, filtered by means of a hard filter paper, and washed with water until there was no nitrate on the filter paper.

The resulting platinum oxide ($PtO_2 \cdot H_2O$) so prepared was low in activity as it was. When it is used for the present invention, it should preferably be pretreated in accordance with the procedures mentioned in the specification.

EXAMPLE 3

Active carbon was warmed for 2 to 3 hours with a 10% nitric acid in a water bath, filtered, washed with water, and kneaded with a small quantity of water. The calculated amount of 1% hexachloroplatinic acid aqueous solution was added to the so treated active carbon. The mixture was heated at 50° C. for 3 to 4 hours, cooled, and made alkaline with a 0.6% aqueous solution of potassium hydroxide. It was filtered, washed thoroughly with hot water, and dried in a reduced pressure desiccator in the presence of carbon dioxide. Thus a catalyst of platinum hydroxide on active carbon resulted.

As the so prepared platinum hydroxide catalyst (for instance, 1.8% by weight of platinum hydroxide supported) is low in activity against the ester-forming reaction, it is preferable that it should be pretreated in accordance with the procedures mentioned in the specification.

EXAMPLE 4

A gaseous mixture of ethanol and oxygen in a mole ratio of 1:0.40 was passed through a reactor of the ordinary gas-phase flow type packed with the 0.5% metallic palladium supported catalyst obtained in Example 1, at 126° C. under atmospheric pressure for a contact time of 13.4 seconds. For 2 hours after the initiation of the reaction, the resulting ethyl acetate remained adsorbed onto the catalyst. After that, the reaction proceeded steadily. The conversion of ethanol in this steady state was 22 to 24%, and the selectivity of ethyl acetate was 83–85%, while the selectivity of acetaldehyde was 5 to 7%. Methane and $CO_2$ were formed as by-products.

EXAMPLE 5

The 1.8% platinum hydroxide supported on active carbon prepared in Example 3 was charged into the same reaction vessel as used in Example 3. A gaseous mixture of ethanol and oxygen at a mole ratio of 1:0.31 was passed through it at normal atmospheric pressure at 150° C. for a contact time of 16.1 seconds. The flowing out of ester occurred after 1.5 hours from the initiation of the reaction. The conversion of ethanol at the end of three-hour period was 4.2%, and the selectivity of ethyl acetate was 16.7%.

The same platinum hydroxide catalyst was packed into the same reaction vessel, and a gaseous mixture of formaldehyde, water and air at a mole ratio of 3:7:5 was passed through it for 4 hours at atmospheric pressure at 110° C. Thereafter, a gaseous mixture of ethanol and oxygen at a mole ratio of 1:0.31 was passed through it at atmospheric pressure at 150° C. for a contact time of 15.3 seconds. After one hour from then, the flowing out of ester occurred. Thereafter, the reaction proceeded steadily. At the end of the four-hour period, the conversion of ethanol was 14.6%, the selectivity was 48.1% for ethyl acetate, 10.2% for acetaldehyde and combustion was 41.7%.

EXAMPLE 6

Particles of metallic palladium were charged into the same reaction vessel as used in Example 4, and pretreated with a mixture of formaldehyde, water and air under the same conditions as in Example 5. Thereafter, a mixture of ethanol and isopropanol at a mole ratio of 1:2, with the addition of pressurized air, was flowed over the catalyst at 2.6 atmospheres and 100° C. for a contact time of 18 seconds. An ester began to flow out after 1.2 hours, and immediately the activity of the catalyst became constant. At the end of the four-hour period, the conversion of ethanol was 17.3%, and the selectivity was 83.6% for isopropyl acetate, 10.3% for ethyl acetate and 5.4% for methane.

EXAMPLE 7

The same reaction vessel as used in Example 4 was charged with a catalyst prepared by supporting 1.0% by weight of metallic palladium and 1.4% by weight of palladium oxide on active carbon. The catalyst was pretreated by passing a mixture of acetaldehyde and carbon monoxide at a ratio of 1:1 at atmospheric pressure at 120° C. for three hours. By using this pretreated catalyst, the same procedures as in Example 4 were repeated with respect to ethanol. The conversion of ethanol was 19.8%, and the selectivity was 78.8% for ethyl acetate, 15.6% for acetaldehyde and 5.0% for methane.

EXAMPLE 8

A catalyst prepared by supporting 0.5% by weight of metallic ruthenium on active alumina was charged into the same reaction vessel as used in Example 4, and a gaseous mixture of ethanol and air at a mole ratio of 1:2.4 was passed over the catalyst at atmospheric pressure at 112° C. for a contact time of 5.9 seconds. At the end of 5-hour period, the conversion of ethanol was 22.3%, and the selectivity was 15.3% for ethyl acetate and 80.2% for acetaldehyde.

EXAMPLE 9

A catalyst prepared by supporting 0.5% by weight of metallic platinum on active alumina was charged into the same reaction vessel as used in Example 4, and a gaseous mixture of ethanol, oxygen and nitrogen at a mole ratio of 1:0.49:1.0 was flowed over the catalyst at atmospheric pressure at 90° C. for a contact time of 5.9 seconds. At the end of 5-hour period, the conversion of ethanol was 32.0%, and the selectivity was 15.0% for ethyl acetate, 11.8% for acetaldehyde and 51.5% for carbon dioxide.

EXAMPLE 10

A catalyst prepared by supporting 0.47% by weight of metallic iridium on active alumina was charged into the same reaction vessel as used in Example 4, and a gaseous mixture of ethanol, oxygen and carbon dioxide at a mole ratio of 1:0.49:0.5 was flowed over the catalyst at atmospheric pressure at 170° C. for a contact time of 7.7 seconds. At the end of the three-hour period, the conversion of ethanol was 20.4%, and the selectivity was 36.2% for ethyl acetate and 51.7% for acetaldehyde.

EXAMPLE 11

A catalyst prepared by supporting 0.8% by weight of metallic palladium, 0.5% by weight of metallic ruthenium and 0.4% by weight of metallic rhodium on active carbon was charged into the same reaction vessel as used in Example 4, and a gaseous mixture of methanol, n-butanol and air at a mole ratio of 1:0.7:2.5 was flowed at atmospheric pressure at 140° C. for a contact time of 8.6 seconds. At the end of 2.5-hour period, the conversion of methanol was 61.3%, and the selectivity was 57.6% for butyl formate, 14.8% for methyl formate and 25.3% for carbon dioxide gas. 16%, based on butyl formate, of butyl butyrate was also formed.

EXAMPLE 12

A catalyst prepared by supporting 0.5% by weight of metallic palladium on active carbon was charged into the same reaction vessel as used in Example 4, and a gaseous mixture of acetaldehyde, methanol and oxygen at a mole ratio of 2:2:1 at atmospheric pressure at 110° C. for a contact time of 10.6 seconds. At the end of 5-hour period, the conversion of acetaldehyde was 69.1%, and the selectivity of methyl acetate was 92.6%.

EXAMPLE 13

Platinum hydroxide (1.8% by weight) on active carbon prepared in Example 3 was charged into the same reaction vessel as used in Example 4, and a gaseous mixture of formaldehyde, water and nitrogen at a mole ratio of 3:7:10 was flowed over the catalyst at atmospheric pressure at 130° C. for 4 hours to pretreat the catalyst. Thereafter, a gaseous mixture of acetaldehyde, t-butanol and oxygen at a mole ratio of 2:2:1 was flowed at atmospheric pressure at 135° C. for a contact time of 9.1 seconds. At the end of the 4-hour period, the conversion of acetaldehyde was 53.7%, and the selectivity of t-butyl acetate was 64.1%.

EXAMPLE 14

A catalyst prepared by supporting 1.0% by weight of metallic rhodium on active carbon was charged into the same reaction vessel as used in Example 4, and a gaseous mixture of formaldehyde, sec-butanol, air and water at a mole ratio of 2:2.3:5:2 was passed at atmospheric pressure at 90° C. for a contact time of 4.7 seconds. At the end of the 3-hour period, the conversion of formaldehyde was 58.6%, and the selectivity of butyl formate was 96.1%.

EXAMPLE 15

A catalyst prepared by supporting 1.0% by weight of metallic palladium and 0.7% by weight of metallic iridium on alumina was charged into the same reaction vessel as used in Example 4, and was pretreated by flowing a gaseous mixture of acetaldehyde, water and air at a mole rate of 5:3:6 at atmospheric pressure at 120° C. for 5 hours. A gaseous mixture of acrolein, methanol, oxygen and carbon dioxide at a mole ratio of 1:1.2:0.6:1 was passed at atmospheric pressure at 110° C. for a contact time of 13.3 seconds. At the end of the 2-hour period, the conversion of acrolein was 24.1% and the selectivity of methyl acrylate was 93.7%.

EXAMPLE 16

A catalyst prepared by supporting 2.0% by weight of metallic palladium on active carbon was charged into the same reaction vessel as used in Example 4, and a gaseous mixture of methacrolein, methanol, oxygen and water at a mole ratio of 1:1.3:0.5:0.5 was flowed over the catalyst at atmospheric pressure at 110° C. for a contact time of 11.7 seconds. At the end of the 2-hour period, the conversion of methacrolein was 17.3%, and the selectivity was 56.1% for methyl methacrylate and 40.6% for propylene.

EXAMPLE 17

A gaseous mixture of acetaldehyde, allyl alcohol and air at a mole ratio of 1:1.2:2.5 was fed into the same reaction vessel used in Example 4, and was reacted under the same conditions as in Example 16. At the end of the 3-hour period, the conversion of acetaldehyde was 47.1% and the selectivity of allyl acetate was 70.8%.

EXAMPLE 18

Two percent of a catalyst prepared by supporting 2.0% by weight of metallic palladium on active carbon having a particle size of 70–80 mesh was added to a mixture of 150 g. of stearyl alcohol and 300 g. of benzene. A mixture of 15.1 g. of formaldehyde and 4.4 g. of water was blown into a bubble reactor with sufficient amount of air over a period of one hour, at atmospheric pressure and at 65° C. After the end of blowing of formaldehyde, air was subsequently blown into it for more than one hour, and the reaction was terminated. The conversion of formaldehyde was 90% and the selectivity of stearyl formate was 93%. 19 grams of stearyl stearate was formed as by-product.

EXAMPLE 19

Three percent of a catalyst prepared by supporting 2.6% by weight of metallic iridium on active carbon having a particle size of 70–80 mesh was added to a mixture of propionaldehyde, dodecyl alcohol and toluene at a mole ratio of 1:1.3:2, and the resulting mixture was charged in the same reaction vessel as used in Example 18 and was heated for 10 hours at atmospheric pressure at 40° C. while blowing air. The conversion of propionaldehyde was 11%, and the selectivity was 71% for dodecyl propionate and 26% for ethane.

EXAMPLE 20

1.0% of catalyst prepared by supporting 1.8% by weight of metallic palladium on active carbon having a particle size of 100–120 mesh was added to methanol, and the mixture was charged into the same reaction vessel as used in Example 18. While blowing air from the bottom of the reactor, the methanol was maintained for 4 hours at 55° C. at atmospheric pressure. The conversion of methanol was 32.2% and the selectivity of methyl formate was 99.7%.

EXAMPLE 21

Two percent of a catalyst prepared by supporting 1.0% by weight of metallic palladium and 1.0% by weight of metallic rhodium on active carbon having a particle size of 50–60 mesh was added to n-hexanol, and the mixture was charged into the same reaction vessel as used in Example 18. While blowing a gaseous mixture of oxygen and nitrogen at a volume ratio of 45:55, the mixture was heated for 6 hours at 70° C. at atmospheric pressure. The conversion of the n-hexanol was 56%, and the selectivity was 81% for hexyl caproate and 13% for caproaldehyde.

EXAMPLE 22

Three percent of a catalyst prepared by supporting 2.3% by weight of metallic rhodium on active carbon having a particle size of 50 to 60 mesh was added to a mixture of 2-ethyl hexanol and benzene at a weight ratio of 1:1, and the resulting mixture was charged into the same reaction vessel as used in Example 18. While blowing air, the mixture was heated for 6 hours at 75° C. at atmospheric pressure. The conversion of 2-ethyl hexanol was 29%, and the selectivity was 42% for 2-ethyl hexyl 2-ethylcaproate, and 47% for 2-ethylcaproaldehyde. The remainder was carbon dioxide gas.

EXAMPLE 23

Three percent of a catalyst prepared by supporting 1.5% by weight of metallic palladium on active carbon having a particle size of 50–60 mesh was added to a mixture of n-dodecyl alcohol and benzene at a weight ratio of 1:1, and the resulting mixture was charged into the same reaction vessel as used in Example 18. While blowing oxygen, the mixture was heated for 6 hours at atmospheric pressure at 75° C. The conversion of dodecyl alcohol was 43%, and the selectivity was 67% for dodecyl ester of lauric acid and 21% for carbonyl compound.

EXAMPLE 24

Two percent of a catalyst prepared by supporting 2.5% by weight of metallic palladium on diatomaceous earth was added to a mixture of ethanol and phenol at a mole ratio of 1:3, and the resulting mixture was charged into the same reaction vessel as used in Example 18. While blowing air, the mixture was heated for 5 hours at 100° C. at 6 atmospheres. The conversion of ethanol was 38.8% and the selectivity of phenyl acetate was 93.1%.

EXAMPLE 25

Three percent of a catalyst prepared by supporting 2.0% by weight of metallic palladium on active carbon having a particle size of 70–80 mesh was added to a mixture of isobutyraldehyde, cetyl alcohol and toluene at a mole ratio of 1:2.2:3, and the resulting mixture was charged into the same reaction vessel as used in Example 18. While blowing air, the mixture was heated for 6 hours at 85° C. at atmospheric pressure. The conversion of isobutyraldehyde was 28%, and the selectivity of cetyl ester of isobutyric acid was 87%.

EXAMPLE 26

1.5% of a catalyst prepared by supporting 2.5% by weight of metallic palladium on diatomaceous earth was added to a mixture of phthalaldehyde and allyl alcohol at a mole ratio of 1:5.3, and the resulting mixture was charged into the same reaction vessel as used in Example 18. While blowing air, the mixture was heated for 7 hours at 125° C. at 4 atmospheric pressures. The conversion of phthalaldehyde was 41%, and the selectivity was 52% for diallyl phthalate and 37% for monoallyl phthalate.

EXAMPLE 27

3.5% of catalyst prepared by supporting 0.7% by weight of metallic palladium on silica gel powder was added to a mixture of benzaldehyde and cyclohexanol at a mole ratio of 1:1.9. The resulting mixture was heated for 7 hours at 75° C. in the presence of oxygen while stirring in an autoclave. The conversion of benzaldehyde was 33%, and the selectivity of cyclohexyl benzoate was 74.6%.

EXAMPLE 28

A mixture of ethylene glycol and acetaldehyde at a mole ratio of 1:2.3 was treated in the same manner as in Example 27. The conversion of ethylene glycol was 16%, and the selectivity was 27% for ethylene glycol monoacetate and 61% for ethylene glycol diacetate. There was also formed 9% of a polymer prepared from ethylene glycol alone.

EXAMPLE 29

0.2 mole of glycerine and 0.3 mole of phthalaldehyde were dissolved into 250 g. of acetone. 8 grams of a catalyst prepared by supporting 1.0% of metallic palladium on active carbon having a particle size of 100 mesh was added to the solution. Using the same reaction vessel as used in Example 27, the mixture was heated for 18 hours at 100 °C. under pressure while stirring in the presence of air. After cooling, the reaction product was filtered to remove the catalyst, and the acetone and unreacted materials were removed by distillation. 41 grams of a light yellow soft resinous substance was obtained.

I claim:

1. A process for the manufacture of esters of carboxylic acids, which comprises reacting a member selected from the group consisting of alcohols, mixtures of alcohols and mixtures of aldehydes and alcohols with molecular oxygen in the presence of a catalyst selected from the group consisting of palladium and rhodium, oxides thereof, pretreated products of said metals and pretreated products of said oxides, at a temperature of 0 to 300° C., and recovering the esters of carboxylic acids from the resulting product mixture, with the proviso that when alcohols alone are reacted with molecular oxygen, at least one primary alcohol is present.

2. The process according to claim 1 wherein the said catalyst is selected from the group consisting of palladium and rhodium, pretreated products of said metals and pretreated products of oxides of said metals.

3. The process according to claim 1 wherein the said pretreated product is a product obtained by contacting a member selected from the said metals and their oxides, with a system containing a member selected from the group consisting of oxygen-containing compounds as starting materials, oxygen-containing compounds as reaction products, and oxygen-containing compounds such as ketones and organic acids.

4. The process according to claim 1 wherein the said pretreated product is a product obtained by contacting said metal with a system containing molecular oxygen and a member selected from the group consisting of oxygen-containing compounds as starting materials, oxygen-containing compound as reaction products and oxygen-containing compounds such as ketones and organic acids.

5. The process according to claim 1 wherein the said pretreated product is a product obtained by contacting said metal oxide with a system containing a reducing gas and a member selected from the group consisting of oxygen-containing compounds as starting materials, oxygen-containing compound as reaction products and oxygen-containing compounds such as ketones and organic acids.

6. The process according to claim 1 wherein the said catalyst is a metal selected from the group consisting of palladium and rhodium.

7. The process according to claim 1 wherein a member selected from the group consisting of alcohols and mixtures of alcohols containing a primary alochol or alcohols is reacted with molecular oxygen to thereby produce an ester of the corresponding carboxylic acid.

8. The process according to claim 1 wherein a mixture of alcohols and aldehydes is reacted with molecular oxygen to thereby form an ester of corresponding carboxylic acid.

9. The process according to claim 7 wherein the said alcohol is a saturated primary aliphatic alcohol having 1 to 12 carbon atoms.

10. The process according to claim 8 wherein the said alcohol is a saturated aliphatic alcohol having 1 to 20 carbon atoms, and the said aldehyde is a saturated aliphatic aldehyde having 1 to 4 carbon atoms.

11. The process according to claim 8 wherein said aldehyde is a member selected from the group consisting of acetaldehyde and phthalaldehyde, and the said alcohol is allyl alcohol.

12. The process according to claim 8 wherein the said alcohol is methanol and the said aldehyde is acrolein, and wherein methyl acrylate is formed as the ester of carboxylic acid.

13. The process according to claim 8 wherein the said alcohol is methanol, and the said aldehyde is methacrolein, and wherein methyl methacrylate is formed as the ester of carboxylic acid.

14. A process for the manufacture of esters of carboxylic acids which comprises reacting a member selected from the group consisting of alcohols, mixtures of alcohols and mixtures of aldehydes and alcohols in the liquid phase with molecular oxygen in the presence of an iridium catalyst, oxides thereof, pretreated products of iridium and pretreated products of said oxides, at a temperature of 0 to 300° C. and recovering the esters of carboxylic acids from the resulting product mixture, with the proviso that when alcohols alone are reacted with molecular oxygen, at least one primary alcohol is present.

15. A process for the manufacture of esters of carboxylic acids which comprises reacting a mixture of aldehyde and alcohols in the gaseous state with molecular oxygen in the presence of an iridium catalyst, oxides thereof, pretreated products of iridium and pretreated products of said oxides, at a temperature of 0 to 300° C. and recovering the esters of carboxylic acids from the resulting product mixture.

References Cited

UNITED STATES PATENTS

| | | | |
|---|---|---|---|
| 3,211,785 | 10/1965 | Kilroy et al. | 260—530 |
| 3,253,025 | 5/1966 | Brill et al. | 260—486 |
| 3,317,592 | 5/1967 | MacLean et al. | 260—531 |
| 3,342,858 | 9/1967 | Fuhrmann et al. | 260—531 |
| 3,407,220 | 10/1968 | Williams et al. | 260—531 |

LEWIS GOTTS, Primary Examiner

E. J. SKELLY, Assistant Examiner

U.S. Cl. X.R.

252—416, 472; 260—468 R, 475 P, 475 PN, 475 R, 479 R, 479 S, 485 R, 485 G, 485 L, 485 N, 486 R, 486 D, 494, 495